Oct. 29, 1929.    R. G. CHAMBERS    1,734,005
WINDSHIELD STANCHION JOINT
Filed Jan. 11, 1928
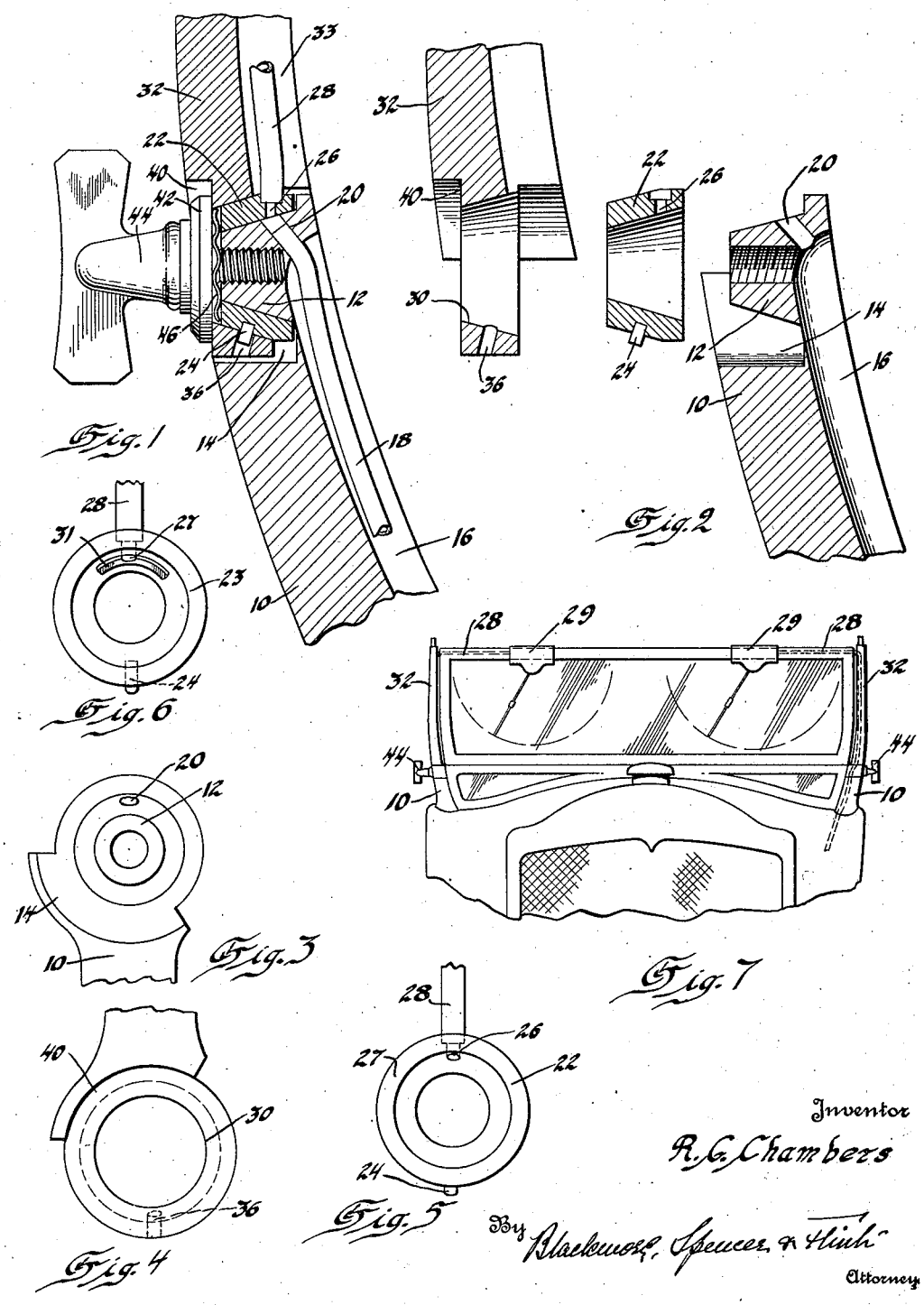

Patented Oct. 29, 1929

1,734,005

UNITED STATES PATENT OFFICE

RUSSELL GUARD CHAMBERS, OF FLINT, MICHIGAN, ASSIGNOR TO GENERAL MOTORS CORPORATION, OF DETROIT, MICHIGAN, A CORPORATION OF DELAWARE

WINDSHIELD-STANCHION JOINT

Application filed January 11, 1928. Serial No. 246,026.

This invention relates to windshield trunnions for supporting the pivoted windshield stanchions of an automotive vehicle.

In cars of the open type, as a touring car or roadster, it is the practice to pivot the windshield stanchions so that the windshield may be adjusted to an inclined or to a horizontal position. Since the advent of the automatic windshield cleaner it has been the practice to extend a suction tube, which is connected with some suitable source of suction such as the vacuum tank or intake manifold, from the region of the engine up to the top of the windshield where the motor for the windshield cleaner is supported.

In an open car in which the windshield stanchions are pivoted, there is some difficulty regarding the disposal of the windshield cleaner tube. It is desirable to have the tube within or hidden by the stanchion so that it will not be unsightly and will not become worn or cut.

It is an object of the present invention to provide a windshield trunnion so constructed that it will insure a tight connection in the suction tube leading to the windshield cleaner, regardless of the position of the windshield. More specifically it is an object of the invention to provide such a construction which will not interfere in any way with the adjustment of the windshield stanchions to any position to which it may be pivoted, and in which the suction tube is supported in a protected position by the windshield stanchion.

Other objects and advantages of the invention will appear in the course of the following description, taken in connection with the accompanying drawing and appended claims.

In the drawing:

Figure 1 is a transverse vertical section through a windshield stanchion embodying my invention.

Figure 2 is an exploded view showing part of the structure illustrated in Figure 1.

Figure 3 is a side view of the lower stanchion as seen from a position to the left thereof.

Figure 4 is a similar side view of the lower portion of the upper stanchion.

Figure 5 is an end view of the conical bushing.

Figure 6 is a view similar to Figure 5 but showing a slightly modified form of bushing.

Figure 7 is a front elevation of a portion of an automotive vehicle, illustrating the application of my invention thereto.

Referring to the drawing, I have illustrated a portion of a lower support 10 which is ordinarily fixed rigidly on a car. On its upper end the support 10 is formed with a frusto-conical boss or trunnion 12 provided with a threaded opening for receiving a fastening bolt. Surrounding the boss 12 is a semi-circular recess 14. On its inner side, the stanchion 10 is formed with a groove 16 in which is disposed a suction conduit which in the present case comprises a tube 18 extending downward to a suitable source of suction (not shown). The upper end of the tube 18 is fixed in an opening 20 formed in the boss 12 adjacent the base or inner side thereof.

Fitting over the boss 12 is a substantially frusto-conical bushing 22 on the lower side of which is rigidly fixed a pin or key 24. On its upper side the bushing 22 has an opening 26 therein in which is fixed the lower end of an upper conduit which comprises a tube 28.

Fitting over the bushing 22 is the lower end 30 of a pivoted stanchion 32. The inner surface of the end 30 is frusto-conical to fit the surface of the bushing 22 while the outer surface on the sides and bottom is substantially circular in outline in order that it may pivot within the recess 14. On its lower side the end 30 is provided with a recess 36 for receiving the key 24. The recess 36 is somewhat wider than the key 24 in an axial direction in order to permit the end 30 to be inserted over the bushing and to permit relative movement in tightening the parts, while the fit prevents rotation of the bushing 22 relative to the lower end 30 of the stanchion. On its inner side the stanchion 32 is provided with a groove 33 in which the tube 28 extends upward to the motor 29 of the windshield cleaner.

The end 30 of the upper stanchion is machined down to provide a recess 40 for receiving a washer 42 through which extends a wing-headed bolt 44 threaded into the trunnion 12. Between washer 42 and the surface of bushing 22 is a corrugated spring washer 46 for resiliently pressing the bushing 22 down on the trunnion 12.

With the construction described, the nut 44 can be tightened to hold the upper stanchion 32 rigid on the lower support. In case it is desired to incline the stanchion in order to incline the windshield or to dispose it in a horzontal plane, it is necessary only to loosen the winged bolts 44, turn the upper stanchion the desired amount, and tighten the bolts again. During the turning movement of the upper stanchion the bushing 22 turns with it on the trunnion 12, and the opening 26 in the bushing moves away from the opening 20 in the trunnion, thus interrupting the connection between the tubes 18 and 28.

In the modified form of my invention, illustrated in Figure 6 I provide a bushing 23 which is similar to bushing 22 except that an opening 27, similar to opening 26 is widened out on its inner side, as at 31. With this construction the opening 27 in the bushing remains in communication with the opening 20 when the stanchions are pivoted forward, thus permitting operation of the cleaner in any adjusted position of the windshield.

In either the main embodiment or the embodiment described with relation to Figure 6, a pivoted connection is provided for the upper stanchion 32 which will insure a tight connection between the upper section 28 and lower section 18 of the suction tube. While I have illustrated the stanchion and support provided with open grooves on their inner side, they may, of course, be provided with grooves which are covered on all sides, or in other words they may be hollow, and I have used the word "grooved" to be construed as including either construction.

The invention is illustrated with reference to the right hand windshield support. This structure is the same as that of the left hand support except that the stanchion illustrated in Figure 3 is mounted on the support shown in Figure 4 for clockwise rotation while in the left hand windshield support the parts must be formed to permit counter-clockwise rotation of the stanchion, as will be readily understood.

I claim:

1. In a device of the class described, a lower support provided with a trunnion, a bushing fitting over said trunnion, a stanchion having a bearing surface fitting said bushing and pivotable on said support, said bushing and trunnion being provided with registering apertures, a conduit having an end fixed in the aperture in the trunnion and extending along said support, a conduit having an end fixed in the aperture in the bushing and extending along said stanchion, means for holding said stanchion in adjusted position, and means for maintaining the connection between the two apertures during rotation of said stanchion.

2. In a device of the class described, a lower support provided with a trunnion, a bushing fitting over said trunnion, a stanchion having a bearing surface fitting said bushing and pivotable on said support, said bushing and trunnion being provided with registering apertures and with abutting surfaces which are conical adjacent said apertures, a conduit having an end fixed in the aperture in said trunnion and extending along said support, a conduit having an end fixed in the aperture in said bushing and extending along said stanchion, and means for holding said stanchion in adjusted position.

3. In a device of the class described, a support provided with a trunnion having a conical surface, a bushing fitting over said trunnion, a stanchion fitting over said bushing and pivotable on said support, said trunnion and bushing being provided with registering apertures, a conduit having an end fixed in the aperture in the trunnion and extending along said support, a conduit having an end fixed in the aperture in the bushing and extending along said stanchion, means for holding said stanchion in adjusted position, and means for maintaining the connection between the two apertures during rotation of said stanchion.

4. In a device of the class described, a support provided with a trunnion having a conical surface, a bushing fitting over said trunnion and having conical inner and outer surfaces, a stanchion fitting over said bushing and held against rotation thereon, said trunnion and bushing being provided with registering apertures, one of said apertures being elongated for maintaining the connection therebetween during rotation of said bushing, a conduit connected with the aperture in said bushing and extending along said stanchion, a conduit connected with the aperture in the trunnion and extending along said support, and means for holding said stanchion in adjusted position on said trunnion.

5. A windshield structure for motor vehicles comprising, a support, a member pivoted on said support, a tube having one end terminating in said support, a second tube having one end terminating in said member, and means adapted to place said tubes in communication with each other at predetermined positions of adjustment of said member relative to said support.

6. A windshield structure for motor vehicles comprising, a support including a conical bearing surface, a sleeve pivotally carried on said bearing surface, a member secured to and supported on said sleeve, conduits having one end terminating in said support and sleeve respectively, and means adapted to place said conduits in communication with each other at predetermined positions of adjustment of said sleeve relative to said support.

In testimony whereof I affix my signature.

RUSSELL GUARD CHAMBERS.